April 25, 1961 E. L. BOWMAN 2,981,612
METHOD FOR CHEMICAL MILLING HONEYCOMB MATERIAL
Filed Oct. 21, 1958 3 Sheets-Sheet 1
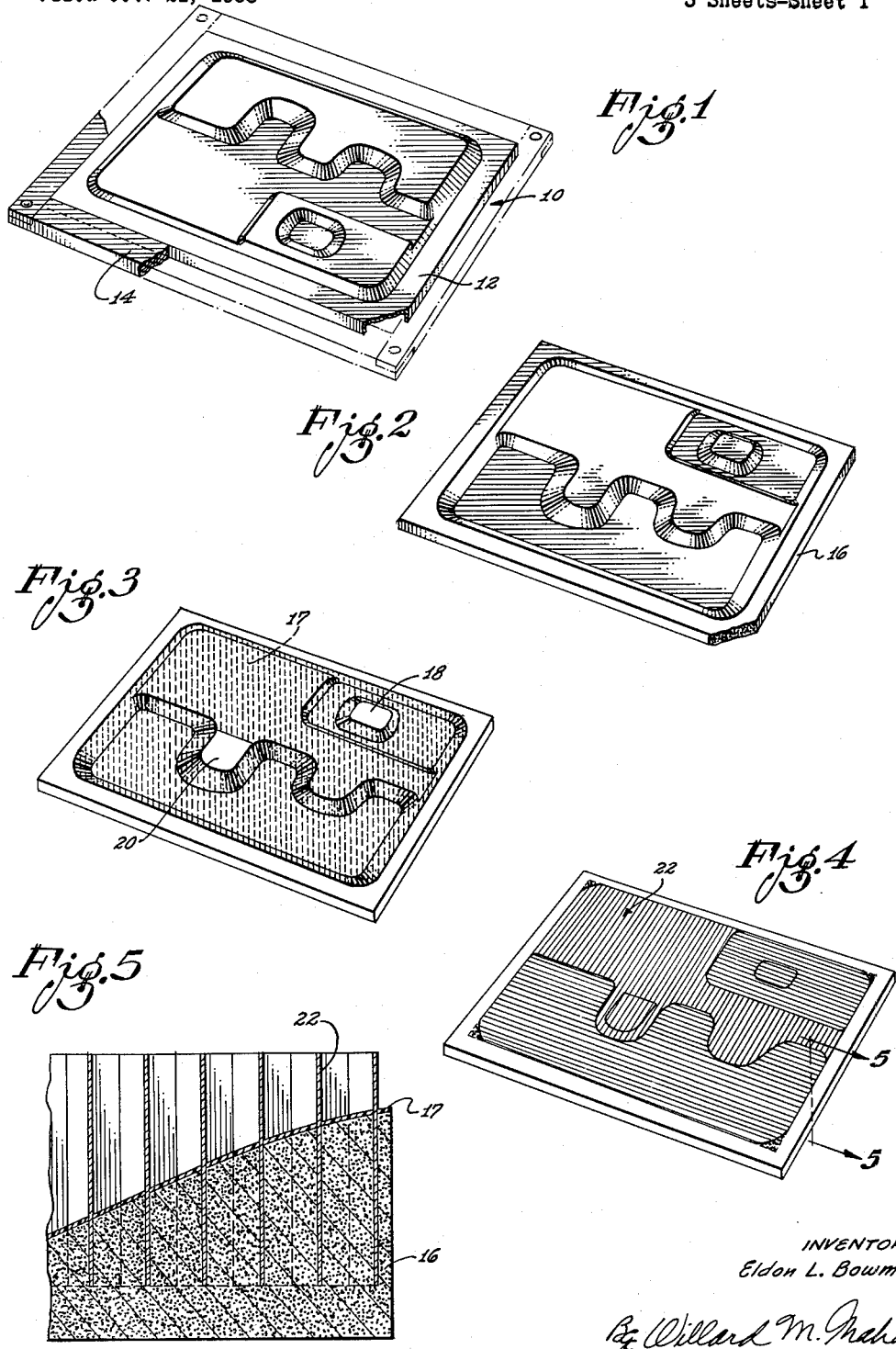
INVENTOR:
Eldon L. Bowman
By Willard M. Graham
Agents April 25, 1961 E. L. BOWMAN 2,981,612
METHOD FOR CHEMICAL MILLING HONEYCOMB MATERIAL
Filed Oct. 21, 1958 3 Sheets-Sheet 2

INVENTOR:
Eldon L. Bowman

By Willard M. Graham
Agent

April 25, 1961  E. L. BOWMAN  2,981,612
METHOD FOR CHEMICAL MILLING HONEYCOMB MATERIAL
Filed Oct. 21, 1958  3 Sheets-Sheet 3

INVENTOR:
Eldon L. Bowman

By Willard M. Graham
Agent

United States Patent Office 2,981,612
Patented Apr. 25, 1961

2,981,612

METHOD FOR CHEMICAL MILLING HONEYCOMB MATERIAL

Eldon L. Bowman, Redondo Beach, Calif., assignor to Northrop Corporation, a corporation of California Filed Oct. 21, 1958, Ser. No. 768,800

18 Claims. (Cl. 41—43)

This invention has to do with a method for contouring a cellular material such as a metal honeycomb object as, for example, a wing core for an airplane.

Contouring, shaping, and the mere cutting of honeycomb material provide very peculiar problems. The reason being that the material is essentially a "flabby" or unstable accordion structure. It has been extremely difficult, if not impossible, to provide honeycomb core that has, in combination, acute compound curves, feathered or very fine tapered edges, and openings located closely adjacent the curves.

Simple (mono-directional) forming can be done rather easily. The common technique being to use a bending brake or equally applicable equipment. Lack of ductility of the honeycomb structure and plasticity in the adhesive bond for the honeycomb make it difficult to form the material by physical strain. Thus, the degree of forming is limited to that attainable by cell distortion, and varies with cell shape and size. In compound-curvature forming, this is a particular problem.

Expanded metal honeycomb is obviously a difficult material to hold for machining faces without crushing or burring the cell walls, and the problem is magnified as foil thickness is reduced. But, when honeycomb core material is expanded, some holding—and often stabilizing—method or methods is required.

Many forms of equipment and tooling, particularly designed for honeycomb core work, have been tested, some of which have been adopted. None have been able to provide acute compound curves, feathered edges, and openings within or adjacent certain areas without a certain amount of undesirable distortion and mutilation.

An object of this invention is to provide a method of contouring cellular materials and provide acute compound curves, opening in or adjacent certain areas, and tapered or feathered edges, all to extremely accurate tolerances.

Another object of this invention is to provide a method of contouring cellular materials whereby the chemical substances used are relatively inexpensive, readily available and some, after use, are recoverable.

A yet further object of this invention is to provide a method of contouring cellular materials whereby the process may be carried out with a minimum amount of skilled supervision while at the same time obtaining maximum satisfactory results.

Briefly, the invention comprises preparing a contoured mold which may be prepared from a master pattern. Preferably, a rubber-like coating material is applied and cured to the contoured surface of the mold, in order to add strength to the mold material. The honeycomb structure, preferably in sheet form, is inserted through the coating into the mold to the desired depth. The exposed portions of the cells of the honeycomb are protected by a masking material, preferably by filling the cells with a hot melt composition. The mold is removed from the honeycomb structure, such as by disintegrating the mold material in water or other liquid. The exposed honeycomb structure is placed in a chemical etching bath or tank until the exposed core material is removed. This gives a contoured structure. The masking material and coating material may then be removed, such as by mechanically stripping.

Figure 1 is a perspective view, illustrating a master pattern used in the process.

Figure 2 is a perspective view, illustrating a mold made from the master pattern.

Figure 3 is a perspective view, illustrating the mold with a lining or coating material applied thereto.

Figure 4 is a perspective view, illustrating the honeycomb material as applied to the mold.

Figure 5 is an enlarged, cross-sectional view taken on line 5—5 of Figure 4, looking in the direction indicated.

Figure 6:
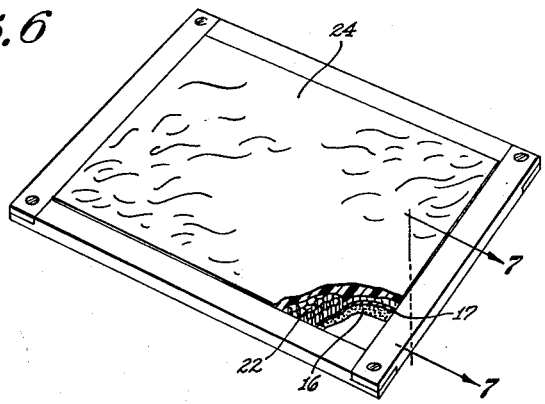
Figure 6 is a perspective view, illustrating the honeycomb material of Figure 4, filled with a masking composition.

Referring to the drawings for a more detailed description of the present invention, 10 broadly designates a master pattern having compound curves, tapered or feathered edges and the like, as may be determined by referring to Figure 1. The pattern per se is defined by a peripheral flange 12. It is virtually impossible to machine, in any way, the curves and depressions because of their location and form characteristics. Many structures include such panels as represented by the master pattern shown. It is to be understood that the illustrated pattern 10 is merely representative of innumerable configurations that may be shown.

Around the master pattern 10 is placed a break-away or removable frame 14 that is to function as a container or retainer for the preparation of the mold.

A disposable release material or agent, polyethylene film, can be applied to the master pattern by the well known vacuum bag method. This procedure is adopted for the reason that the sharp corners and depressions must be well defined in order that an accurate mold may be obtained. Obviously, other release agents, such as paraffin wax, may also be applied. Likewise the release agent can be omitted, but without it there is difficulty of obtaining release for some contours.

The master pattern, preferably with the release agent therein, is then coated with a readily removable material, such as plaster, which after drying can be disintegrated in water. A suitable composition consists of talc and a combination of 20–80 parts talc and break-away plaster. These are thoroughly mixed dry until no lumps are present. The optimum combination is 30 parts talc and 70 parts break-away plaster. The above mixed ingredients are added to 100–125 parts of water, 115 parts being optimum. The materials are throughly mixed together, powder to water, to prevent the formation of lumps and provide a slurry. The slurry is poured into and over the pattern until the retainer frame 14 is filled and the upper exposed surface of the slurry, when dry, will provide a flat surface. The slurry is to set in the pattern, at room temperature for 15–45 minutes, 30 minutes being optimum. The slurry, although still retaining some water, sets up solid in the time stated to provide a plaster mold 16, Figure 2, that is very weak and readily disintegrated in water. Likewise plastics containing a water soluble binding agent can be used. Various other mold materials may be used, but preferably the mold formed should be porous or otherwise compressible in order to avoid distortion.

After the material has become solid the frame 14 and release agent is removed and the mold 16 is removed from the pattern 10. The mold is, of course, a negative of the pattern 10.

The plaster mold 16 of the composition illustrated is dried in an oven for 3–24 hours at a temperature between 120° F. and 250° F. In the completely dry state, the mold is very porous and very smooth and additional strength is obtained. The porosity of the mold is minute and for all intents and purposes not visible to the unaided eye. If the mold is dried at a temperature above 250° F., destructive checking and cracking may occur.

Following the complete drying of the mold 16, a liquid coating or lining material 17 is preferably applied. However, those areas, 18 and 20, which define openings, in the final product, may not be covered, Figure 3. Extreme care is exercised to assure the proper application of the lining or coating material 17. The lining consists of 90–110 parts of a plastisol, such as a rubber latex containing sulfur or other vulcanizer, 10–30 parts of an inner filler, such as silica flour, and 0.5–1 part of coloring material. The optimum amounts of the materials are 100 parts of plastisol, 20 parts filler, and preferably 0.5 part of coloring material, such as lamp black. These materials are thoroughly mixed together and brushed on, or otherwise applied, to the mold in the areas previously mentioned. Addition of the coloring material is optional and need not be used if not desired.

The mold preferably with the coating or lining applied is then heated to about 180° F. for 15 to 30 minutes or until the coating or lining jells, but is not completely cured. However, the same process can occur at room temperature or any temperature between that of the room and 180° F. The partial curing takes longer at temperatures below 180° F.

The coating or lining, as applied to the mold, is not to be over 1/8" thick and 1/16" is preferred. The coating in the partially cured condition has very little elastic strength and, as a result, can be easily cut with a relatively sharp edge.

The next step in the method is to place the mold 16 in a press and a sheet of honeycomb material 22, of the desired density and cell size, is placed over the mold. The press, very accurately controlled, is lowered and the core is forced through the coating, if present, into the mold to the proper depth, Figures 4 and 5. All of the honeycomb material 22 in some instances, as illustrated, may be urged into the mold 16. That part of the honeycomb material entirely forced into the mold provides for the openings. In other words, the shape of the mold will determine the location of the openings. Distilled water, which functions as a lubricant, may be applied to the honeycomb material.

After the honeycomb material 22 is urged into the mold 16, the entire assembly is placed in an oven maintained at a temperature of 250° F. to 350° F., the optimum being 300° F. At the temperature specified, the coating or lining material 17 completely cures, flows slightly, seals the cuts made by the honeycomb material 22 and lightly bonds to the exposed honeycomb material. The curing time for the coating material 17 is 25 to 45 minutes, and preferably 30 minutes. In the cured state, the coating material becomes elastic.

Figure 7:
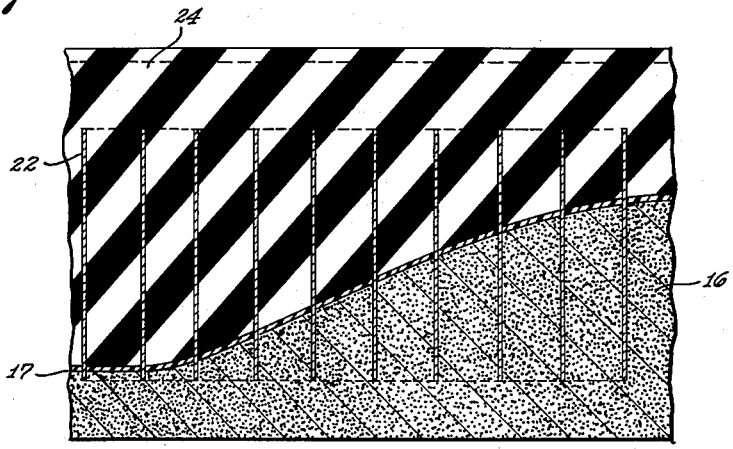
Figure 7 is an enlarged, cross-sectional view taken on line 7—7 of Figure 6, looking in the direction indicated.

Again the frame 14 is placed about the mold 16. A hot melt 24 is prepared, and poured into and over the mold 16, the coating 17, and the honeycomb material 22 in the manner illustrated in Figures 6 and 7. The hot melt 24 preferably consists of about 60 percent vinyl resin (copolymer of vinyl acetate or vinyl chloride) and 40 percent di octyl phthalate, but paraffin or other material resistant to acid may be used. An alternative method is the spraying of the exposed honeycomb material with an acid resistant paint, such as asphaltum.

The procedure for preparing and pouring the hot melt 24 is as follows: While the coating or lining material 17 is in the oven being cured, the hot melt is being prepared. When the cured coating material is removed from the oven and before it has cooled, the hot melt is poured in the manner previously described. The open cells of the honeycomb material 22 are completely covered. The hot melt is permitted to cool at room temperature. In the cooled state, the hot melt material 24 is elastic.

After the hot melt is completely cooled, the plaster mold 16, which is disintegrable by water, is washed away by exposing the same to fine jets of hot water. The coating or lining 17, the honeycomb material 22, and the hot melt are not water soluble. Once the plaster mold material 16 is removed, a structure such as seen in Figure 8 is obtained.

It is to be noted that the cells of the honeycomb material 22 which were embedded in the mold 16 are now completely exposed.

Figure 8:
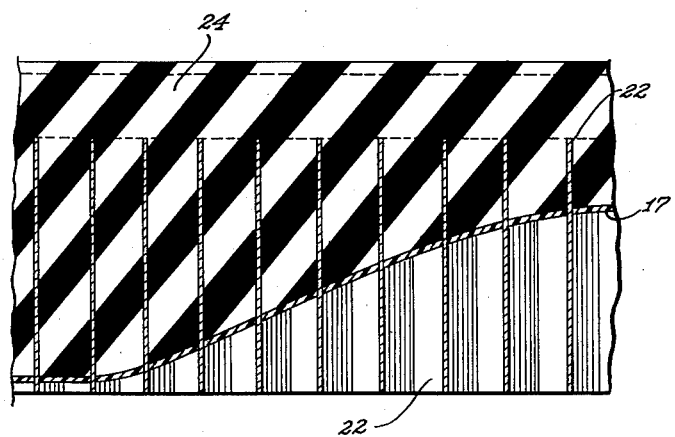
Figure 8 is an enlarged, cross-sectional view similar to Figure 7, but with the mold removed.

The honeycomb material 22, as it is seen in Figure 8, is placed, exposed core up, in an etch tank preferably containing nitric, hydrochloric, and phosphoric acid. The solution in the tank, maintained at 150° F., dissolves the honeycomb material 22 in a very short time. The concentration of the etch solution, the cell, and core size determine the dissolving time. However, the coating material 17, being elastic and bonded to the core cell walls will stop the chemical action of the etching solution. In other words, the coating material 17 will expand over the cell walls of the honeycomb material 22 to stop the dissolving action.

After all the desired honeycomb material 22 is removed, the now shaped honeycomb material 22, the coating 17, and the hot melt 24 is removed from the tank and washed clean with water.

Figure 9:
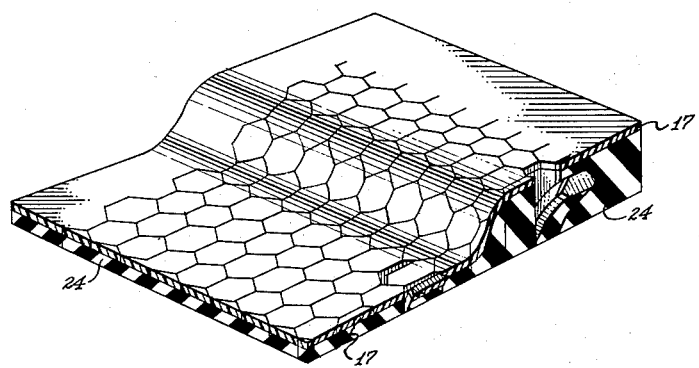
Figure 9 is a perspective sectional view, illustrating the contoured core with the masking composition still in position.

Figure 9 shows the shaped honeycomb core 22 with the coating or lining 17 and the hot melt material 24 in place.

The hot melt 24 and the coating material 17, which adhered to the hot melt during the pouring of the latter, is removed from the honeycomb core 22 and preferably reclaimed to be used again.

Figure 10:
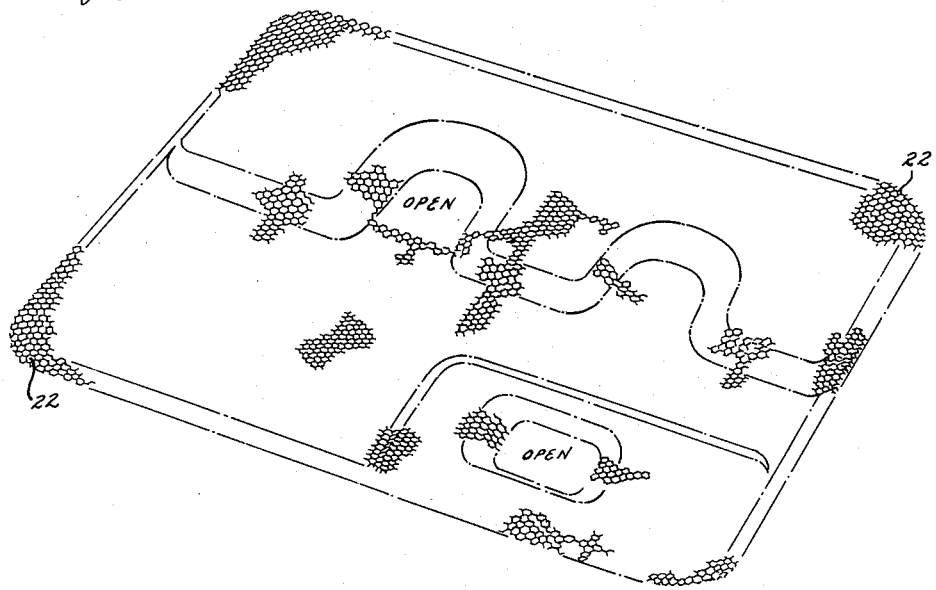
Figure 10 is a perspective view, illustrating the contoured and completed panel of honeycomb core material.

The final panel of chemically milled honeycomb core 22 may be seen in Figure 10. Attention is directed to the fact that it has the same configuration as the master pattern illustrated in Figure 1.

While, in order to comply with the statute, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

I claim:

1. The method of chemical milling honeycomb core, comprising applying a settable mold material to a prepared pattern; removing the pattern and setting the mold material; applying and partially curing a curable coating material on said mold; inserting honeycomb material into the coating material and mold to the desired depth; curing the coating material; applying hot melt material on the mold to fill the exposed cells of honeycomb material; and removing the mold from the honeycomb material; inserting the honeycomb material into a chemical etching material until exposed honeycomb material cells have been removed; and removing the coating and hot melt material from the contoured honeycomb core.

2. The method of chemical milling honeycomb core, comprising applying a settable mold material to a prepared pattern; removing the pattern and setting the mold material; applying and partially curing a curable coating material on said mold; inserting honeycomb material into the coating material and mold to the desired depth; completely curing the coating material; applying hot melt material on the mold to fill the exposed cells of honeycomb material; and removing the mold from the honeycomb material; inserting the honeycomb material into a chemical etching material until exposed honeycomb material cells have been removed; and removing the mask and hot melt material from the contoured honeycomb core; said mold material is to be cured at a temperature of 120° F. to 250° F.

3. The method of chemical milling honeycomb core, comprising applying a mold material to a prepared pattern; removing the pattern and curing the mold material; applying and partially curing a rubber material on said mold; inserting honeycomb core into the rubber material and mold to the desired depth; completely curing the rubber material; applying hot melt material on the mold to fill the exposed cells of honeycomb core; removing the mold from the honeycomb core; inserting the core into a chemical etching material until exposed honeycomb core cells have been removed; and removing the rubber and hot melt material from the honeycomb core.

4. The method of chemical milling honeycomb core, comprising applying a mold material to a prepared pattern; removing the pattern and curing the mold material; applying and partially curing a rubber material on said mold; inserting honeycomb core into the masking material and mold to the desired depth; completely curing the rubber material; applying hot melt material on the mold to fill the exposed cells of honeycomb core; removing the mold from the honeycomb core; inserting the core into a chemical etching material until exposed honeycomb core cells have been removed; and removing the rubber and hot melt material from the honeycomb core.

5. The method of chemical milling honeycomb core, comprising applying a plaster mold material to a prepared pattern; removing the pattern and setting the mold material at a temperature of 120° F. to 250° F.; applying and partially curing a coating material on said mold at a temperature of about 180° F.; inserting honeycomb material into the coating material and mold to the desired depth; completely curing the coating material; applying hot melt material on the mold to fill the exposed cells of honeycomb material; and removing the mold from the honeycomb material; inserting the honeycomb material into a chemical etching material until exposed honeycomb material cells have been removed; and removing the coating and hot melt material from the contoured honeycomb core.

6. The method of chemical milling honeycomb core, comprising applying a plaster mold material to a prepared pattern; removing the pattern and curing the mold material at a temperature of 120° F. to 250° F.; applying and partially curing a rubber coating material on said mold; inserting honeycomb material into the coating material and mold to the desired depth, completely curing the coating material at a temperature of 250° F. to 350° F.; applying hot melt material on the mold to fill the exposed cells of honeycomb material; and removing the mold from the honeycomb material; inserting the honeycomb material into a chemical etching material until the exposed honeycomb material cells have been removed; and removing the coating and hot melt material from the contoured honeycomb core.

7. The method of chemical milling honeycomb core, comprising applying a plaster mold material to a prepared pattern; removing the pattern and curing the mold material at a temperature of 120° F. to 250° F.; applying and partially curing a rubber coating material on said mold at a temperature of about 180° F.; inserting honeycomb core into the coating material and mold to the desired depth; completely curing the coating material; applying hot melt material on the mold to fill the exposed cells of honeycomb core; and removing the mold from the honeycomb core; inserting the core into a chemical etching material until exposed honeycomb core cells have been removed; and removing the mask and hot melt material from the honeycomb core.

8. The method of chemical milling honeycomb core, comprising applying a mold material to a prepared pattern; removing the pattern and setting the mold material; applying and partially curing a coating material on said mold; inserting honeycomb material into the coating material and mold to the desired depth; completely curing the coating material; applying hot melt material on the mold to fill the exposed cells of honeycomb material; and removing the mold from the honeycomb material; inserting the honeycomb material into a chemical etching material until exposed honeycomb material cells have been removed; and removing the coating and hot melt material from the contoured honeycomb core; said coating material to be completely cured for 25 to 45 minutes.

9. The method of chemical milling honeycomb core, comprising applying a mold material to a prepared pattern; removing the pattern and curing the mold material; applying and partially curing a rubber coating material on said mold; inserting honeycomb core into the coating material and mold to the desired depth; completely curing the coating material; applying hot melt material on the mold to fill the exposed cells of honeycomb core; and removing the mold from the honeycomb core; inserting the core into a chemical etching material until exposed honeycomb core cells have been removed; and removing the coating and hot melt material from the honeycomb core; said mold material is to be set at a temperature of 120° F. to 250° F.; said coating material to be completely cured for 25 to 45 minutes.

10. The method of chemical milling honeycomb core, comprising applying a mold material to a prepared pattern; removing the pattern and curing the mold material; applying and partially curing a coating material on said mold; inserting honeycomb core into the coating material and mold to the desired depth; completely curing the coating material; applying hot melt material on the mold to fill the exposed cells of honeycomb core; and removing the mold from the honeycomb core; inserting the core into a chemical etching material until exposed honeycomb core cells have been removed; and removing the coating and hot melt material from the honeycomb core; said coating material to be partially cured at a temperature of about 180° F.; said coating material to be completely cured for 25 to 45 minutes.

11. The method of chemical milling honeycomb core, comprising applying a mold material to a prepared pattern; removing the pattern and curing the mold material; applying and partially curing a coating material on said mold; inserting honeycomb core into the coating material and mold to the desired depth; completely curing the coating material; applying hot melt material on the mold to fill the exposed cells of honeycomb core; and removing the mold from the honeycomb core; inserting the core into a chemical etching material until exposed honeycomb core cells have been removed; and removing the coating and hot melt material from the honeycomb core; said coating material to be completely cured at a temperature of 250° F. to 350° F. for 25 to 45 minutes.

12. The method of chemical milling honeycomb core, comprising applying a mold material to a prepared pattern; removing the pattern and setting the mold material at a temperature of 120° F. to 250° F.; applying and partially curing a coating material on said mold at a temperature of about 180° F.; inserting honeycomb material into the coating material and mold to the desired depth; completely curing the coating material; applying hot melt material on the mold to fill the exposed cells of honeycomb material; and removing the mold from the honeycomb material; inserting the honeycomb material into a chemical etching material until exposed honeycomb material cells have been removed; and removing the coating and hot melt material from the contoured honeycomb core; said coating material to be completely cured for 25 to 45 minutes.

13. The method of chemical milling honeycomb core, comprising applying a plaster mold material to a prepared pattern; removing the pattern and curing the mold material at a temperature of 120° F. to 250° F.; applying and partially curing a coating material on said mold; inserting honeycomb material into the coating material and mold to the desired depth; completely curing the coating material at a temperature of 250° F. to 350° F.; applying hot melt material on the mold to fill the exposed cells of honeycomb material; and removing the mold from the honeycomb material; inserting the honeycomb material into a chemical etching material until exposed honeycomb material cells have been removed; and removing the coating and hot melt material from the contoured honeycomb core; said coating material to be completely cured for 25 to 45 minutes.

14. The method of chemical milling honeycomb core, comprising applying a plaster mold material to a prepared pattern; removing the pattern and curing the mold material at a temperature of 120° F. to 250° F.; applying and partially curing a rubber coating material on said mold at a temperature of about 180° F.; inserting honeycomb core into the coating material and mold to the desired depth; completely curing the coating material; applying hot melt material on the mold to fill the exposed cells of honeycomb core; and removing the mold from the honeycomb core; inserting the core into a chemical etching material until exposed honeycomb core cells have been removed; and removing the coating and hot melt material from the honeycomb core; said coating material to be completley cured at a temperature of 250° F. to 350° F. for 25 to 45 minutes.

15. The method of contouring an expanded metal honeycomb structure having a plurality of cells comprising the following steps, preparing a contoured mold, coating the surface of said mold with a plastisol, inserting said honeycomb structure into said mold so that a portion of said cells are exposed, the exposed portions of said cells being filled with a masking material, removing the mold from the honeycomb structure and etching away the honeycomb structure unprotected by the plastisol.

16. The method of contouring an expanded metal honeycomb structure having a plurality of cells comprising the following steps, preparing a contoured mold, coating the surface of said mold with a plastisol, inserting said honeycomb structure into said mold so that a portion of said cells are exposed, the exposed portions of said cells being filled with a hot melt composition, removing the mold from the honeycomb structure and etching away the honeycomb structure unprotected by the plastisol.

17. In the method of contouring a honeycomb core comprising the following steps: applying a settable mold material to a prepared pattern; removing the pattern and setting the mold material; applying and partially curing a curable coating material on said mold; inserting honeycomb material into the coating material and mold to the desired depth; curing the coating material; applying hot melt material on the mold to fill the exposed cells of honeycomb material, and removing the mold from the honeycomb material.

18. In the method of contouring a honeycomb core comprising the following steps: applying a mold material to a prepared pattern; removing the pattern and curing the mold material; applying and partially curing a rubber material on said mold; inserting honeycomb core into the rubber material and mold to the desired depth; completely curing the rubber material; applying hot melt material on the mold to fill the exposed cells of honeycomb core, and removing the mold from the honeycomb core.

References Cited in the file of this patent

UNITED STATES PATENTS

| 1,332,445 | Mershon | Mar. 2, 1920 |
| 2,328,302 | Simison | Aug. 31, 1943 |
| 2,491,147 | Zahn | Dec. 13, 1949 |
| 2,849,299 | Young | Aug. 26, 1958 |
| 2,855,664 | Griffith et al. | Oct. 14, 1958 |

OTHER REFERENCES

Popular Science, vol. 169, Issue 4, page 124, October 1956, "Honeycombed Metal Article."